United States Patent
Yoaz et al.

(10) Patent No.: US 7,451,133 B2
(45) Date of Patent: Nov. 11, 2008

(54) EXECUTING NESTED SUBQUERIES OF PARALLEL TABLE FUNCTIONS IN THE PARALLEL SINGLE CURSOR MODEL

(75) Inventors: Adiel Yoaz, Foster City, CA (US); Thierry Cruanes, Redwood City, CA (US); Bhaskar Ghosh, Burlingame, CA (US); Subramanian Muralidhar, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 448 days.

(21) Appl. No.: 10/930,433

(22) Filed: Aug. 30, 2004

(65) Prior Publication Data

US 2005/0131880 A1 Jun. 16, 2005

Related U.S. Application Data

(63) Continuation-in-part of application No. 10/901,411, filed on Jul. 27, 2004, now Pat. No. 7,340,452, and a continuation-in-part of application No. 10/898,300, filed on Jul. 23, 2004, now Pat. No. 7,203,676, and a continuation-in-part of application No. 10/865,178, filed on Jun. 9, 2004, now Pat. No. 7,203,672, and a continuation-in-part of application No. 10/841,991, filed on May 6, 2004, and a continuation-in-part of application No. 10/824,887, filed on Apr. 13, 2004.

(60) Provisional application No. 60/530,413, filed on Dec. 16, 2003.

(51) Int. Cl.
*G06F 7/00* (2006.01)
*G06F 17/30* (2006.01)

(52) U.S. Cl. .................... 707/3; 707/1; 707/2; 707/4; 707/5; 707/6

(58) Field of Classification Search ................ 707/1–10
See application file for complete search history.

(56) References Cited

U.S. PATENT DOCUMENTS

| 4,860,201 | A | | 8/1989 | Stolfo et al. |
| 5,325,525 | A | * | 6/1994 | Shan et al. ................ 718/104 |

(Continued)

OTHER PUBLICATIONS

"Office Action" received in related case U.S. Appl. No. 10/944,175, filed Sep. 16, 2004, 20 pages.

*Primary Examiner*—Jean B. Fleurantin
*Assistant Examiner*—Hares Jami
(74) *Attorney, Agent, or Firm*—Hickman Palermo Truong & Becker LLP

(57) ABSTRACT

Techniques are provided for processing a database statement that includes a table function capable of parallel execution, where the input of the table function is specified in a subquery. During compilation of the database statement, a global cursor is generated for the database statement. The global cursor includes a first plan component for executing the table function and a second plan component for generating input for the table function. A "dummy" cursor is then generated. When slaves execute the table function, they call the dummy cursor for input. When a slave calls the dummy cursor for input, the dummy cursor causes a context switch back to the global cursor, so that the second plan component within the first cursor generates the input for the slave.

12 Claims, 3 Drawing Sheets

U.S. PATENT DOCUMENTS

| | | | |
|---|---|---|---|
| 5,765,146 A * | 6/1998 | Wolf et al. .................... 707/2 |
| 5,835,755 A | 11/1998 | Stellwagen, Jr. |
| 5,857,180 A | 1/1999 | Hallmark et al. |
| 6,081,801 A | 6/2000 | Cochrane et al. |
| 6,085,189 A * | 7/2000 | Pirahesh et al. ................ 707/3 |
| 6,112,198 A | 8/2000 | Lohman et al. |
| 6,289,334 B1 * | 9/2001 | Reiner et al. ................... 707/3 |
| 6,430,550 B1 | 8/2002 | Leo et al. |
| 6,466,931 B1 | 10/2002 | Attaluri et al. |
| 6,507,834 B1 | 1/2003 | Kabra et al. |
| 6,529,901 B1 | 3/2003 | Chaudhuri et al. |
| 6,622,138 B1 | 9/2003 | Bellamkonda et al. |
| 6,625,593 B1 | 9/2003 | Leung et al. |
| 6,721,724 B1 | 4/2004 | Galindo-Legaria et al. |
| 6,910,032 B2 | 6/2005 | Carlson et al. |
| 6,928,451 B2 | 8/2005 | Mogi et al. |
| 6,954,776 B1 | 10/2005 | Cruanes et al. |
| 6,968,335 B2 | 11/2005 | Bayliss et al. |
| 7,020,661 B1 | 3/2006 | Cruanes et al. |
| 7,051,034 B1 * | 5/2006 | Ghosh et al. ................ 707/100 |
| 7,089,356 B1 | 8/2006 | Chen et al. |
| 7,234,112 B1 | 6/2007 | Brown et al. |
| 2002/0038300 A1 | 3/2002 | Iwata et al. |
| 2003/0055813 A1 * | 3/2003 | Chaudhuri et al. ............. 707/3 |
| 2003/0065644 A1 | 4/2003 | Horman et al. |
| 2003/0229640 A1 | 12/2003 | Carlson et al. |
| 2004/0172626 A1 | 9/2004 | Jalan et al. |
| 2005/0049996 A1 | 3/2005 | Srinivasan et al. |
| 2005/0131879 A1 | 6/2005 | Ghosh et al. .................... 707/3 |
| 2005/0131890 A1 * | 6/2005 | Cruanes et al. ................ 707/4 |
| 2005/0132383 A1 * | 6/2005 | Ghosh et al. ................ 719/312 |

* cited by examiner

EXECUTING NESTED SUBQUERIES OF PARALLEL TABLE FUNCTIONS IN THE PARALLEL SINGLE CURSOR MODEL

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

This application is a continuation-in-part of U.S. patent application Ser. No. 10/824,887, entitled "COMPILATION AND PROCESSING A PARALLEL SINGLE CURSOR MODEL", filed on Apr. 13, 2004, the contents of which are incorporated herein, in their entirety, for all purposes.

This application is a continuation-in-part of U.S. patent application Ser. No. 10/841,991, entitled "EXECUTING FILTER SUBQUERIES USING A PARALLEL SINGLE CURSOR MODEL", filed on May 6, 2004, the contents of which are incorporated herein, in their entirety, for all purposes.

This application is a continuation-in-part of U.S. patent application Ser. No. 10/865,178, entitled "COMMUNICATING EXTERNAL EXPRESSIONS USING A PARALLEL SINGLE CURSOR MODEL", filed on Jun. 9, 2004 now U.S. Pat. No. 7,203,672, the contents of which are incorporated herein, in their entirety, for all purposes.

This application is a continuation-in-part of U.S. patent application Ser. No. 10/901,411, entitled "PARALLEL SINGLE CURSOR MODEL ON MULTIPLE-SERVER CONFIGURATIONS", filed on Jul. 27, 2004 now U.S. Pat. No. 7,340,452, the contents of which are incorporated herein, in their entirety, for all purposes.

This application is a continuation-in-part of U.S. patent application Ser. No. 10/898,300, entitled "DYNAMIC PERFORMANCE VIEWS WITH A PARALLEL SINGLE CURSOR MODEL", filed on Jul. 23, 2004 now U.S. Pat. No. 7,203,676, the contents of which are incorporated herein, in their entirety, for all purposes.

This application is related to:

U.S. patent application Ser. No. 10/944,175, entitled "EXECUTING A PARALLEL SINGLE CURSOR MODEL", filed on Sep. 16, 2004; the contents of which are incorporated herein, in their entirety, for all purposes.

FIELD OF THE INVENTION

The present invention relates to managing data and, more specifically, to parallelizing operations that involve managing data in multiple-server systems.

BACKGROUND

Database applications interact with a database server by submitting to the database server commands that cause the database server to perform operations on data stored in a database. A database command that is sent from a database application to a database server contains the "original statement" of the database command.

For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by an SQL command by parallelizing portions of the execution plan of the query. The row-source approach to parallelizing queries is described in greater detail below.

Multiple-server Database Systems

A typical relational database management system includes a database and a database server. Typically, every time a database system is started, a system global area (SGA) is allocated and certain background processes are started. The combination of the background processes and memory buffers is referred to as a database server.

To take advantage of some hardware architectures (for example, shared disk systems) where multiple computers share access to data, software, or peripheral devices, multiple database server can share a single physical database. This allows users from several computers to access the same physical database with increased performance.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never show. Given the complexity of this picture, parallel queries can be hard to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

As explained above, slave SQL is a means to generate the correct execution plan on the slave. To do this the database server has to add, parse and maintain special slave SQL constructs such as group-by staging operators, bitmap index specific operators, etc. Supporting slave SQL requires specialized slave-specific support from parsing all the way through execution. Also, the new constructs required by slave SQL have to be SQL expressible. Satisfying these requirements can be a difficult and error-prone process, and can affect the stability and maintainability of the architecture and quality of a SQL compilation engine. In addition, the new constructs required by slave SQL have to be SQL expressible.

As mentioned above, one step in the generation of the slave SQL statements that are sent to the slave sets is the unparsing of the row-source tree created for the original statement, and the data-flow operators contained therein. Such unparsing operations are difficult and error-prone. Typically, the database server has to generate a (supposedly implementation free) high level representation of the operations represented by each of the data flow operators. Within a relational database system that supports the SQL language, it is natural that the SQL language is used to express such high level representations of dataflow operators.

Thus, while the original statement is parsed to derive the query plan, portions of the query plan must be "un-parsed" to produce slave SQL statements. Unfortunately, by the time the database server reaches the post-compilation phase, when unparsing for slave SQL is performed, the compilation process has modified or moved around information (e.g. predicates) that needs to be gathered together again to correctly regenerate a query. This unparsing process is very specific to the parallel execution engine and requires statement-specific support, which can be cumbersome and error-prone.

In addition, using the slave SQL approach, parallelization of new SQL operations is usually done well after the design and implementation of the serial operation. Some of the decisions taken in the compilation layers for the serial implementation (which is based on the original statement) can contradict the requirements of generation and support for slave SQL.

Parallel Shared Cursor

To avoid the problems inherent in the use of slave SQL, techniques have been developed for executing queries, or portions thereof, in parallel, in a multiple-server environment, without using slave SQL to communicate to each slave the operations to be performed by the slave. Instead of generating one cursor for the query coordinator (QC) based on the original statement, and separate cursors for each DFO based on the slave SQL, the techniques involve sharing either (1) the cursor that is generated from the original statement, or (2) an equivalent cursor, among the various participants involved in the parallel execution of the operations specified in the original statement. The model used by these techniques is referred to herein as the "Parallel Shared Cursor" (PSC) model of processing, in parallel, the operations specified in SQL queries.

The Parallel Shared-Cursor (PSC) based model provides a simpler and more manageable architecture for parallel SQL cursors. Specifically, in the PSC model, the database server builds a single cursor that contains the information needed for parallel execution, and is used for the entire parallel execution process, by both the QC and the slaves on a single instance of the database server where cursor sharing is possible. Because QC unparsing and slave parse support for slave SQL is no longer required, the support of new features, monitoring of query progression, and diagnosability of query performance, become better.

Table Functions

Table functions are functions which produce a set of rows as output. The set of rows produced by a table function may be treated as a "virtual" table. Thus, any database statement used for manipulating data in a table may be used to manipulate data produced by a table function.

Table functions may be written in a variety of languages, including C/C++, JAVA, and PL/SQL. The techniques described hereafter are applicable to any database operations that invoke a table function, regardless of the language in which the table function is written. However, for the purpose of discussion, examples shall use PL/SQL-implemented table functions.

A database command that includes a table function is referred to herein as a "table function statement". Table function statements, and the execution thereof, are described in greater detail in U.S. patent application Ser. No. 09/939,311, entitled "METHOD AND SYSTEM FOR PARALLEL EXECUTION OF TABLE FUNCTIONS", naming Ravi Murthy et al. as inventors, filed on Aug. 24, 2001, which is hereby incorporated by reference in its entirety; and in U.S.

patent application Ser. No. 09/938,982 entitled "METHOD AND SYSTEM FOR PIPELINED DATABASE TABLE FUNCTIONS", naming Ravi Murthy et al. as inventors, filed on Aug. 24, 2001, which is hereby incorporated by reference in its entirety.

Table functions may operate on one or more input parameters. Typically, the input for a table function is a set of rows, referred to herein as the "input rows". The input rows of a table function may be defined by a database statement. A database statement that defines the input rows of a table function is referred to herein as the "nested query".

Execution of a table function statement can be broken down into three distinct phases: (1) execution of the nested query to generate input rows for the table function, (2) execution the table function to produce a virtual table based upon the input rows, and (3) execution of the operations, specified in the table function statement, on the rows of the virtual table produced by the table function. The operations performed in each of these three phases are respectively referred to as phase-one, phase-two and phase-three operations. Note that the three phases are executed in a demand-driven data-flow based sequence. That is, the server calls phase 2 to execute the table function to build the virtual table first. The table function starts phase 1 to fetch rows from the input stream via the nested cursor. Once the input rows are available, the table function logic builds and returns the virtual table to the outer query block of the SQL statement for further processing, which is phase 3.

For example, consider the query (Q1):

SELECT * from TF(select*from T)

TF is a table function in the FROM clause of query Q1. In query Q1, the rows produced by the statement "select*from T" are the input rows for TF. Thus, "select * from T" is the nested query for TF in query Q1.

During execution of Q1, the phase-one operations involve executing the nested query "select * from T" to produce a set of input rows. The phase-two operations involve producing a virtual table by executing TF on the input rows produced during phase-one. The phase-three operations involve executing the "SELECT * from TF" statement to produce a result set that includes data from all columns of the virtual table produced during phase-two.

Before a table function statement can be executed, it must be compiled to generate a plan of execution. One approach to compiling a table function statement involves generating one cursor for the phase-one operations, and a second cursor for the phase-two and phase-three operations. In this approach, the cursor for phase-one operations is referred to as a "nested cursor", and the cursor for the phase-two and phase-three operations is referred to as the "outer cursor" in which the nested cursor is nested. The nested cursor includes an execution plan for the phase-one operations but not the phase-two or phase-three operation. On the other hand, the outer cursor includes an execution plan for performing the phase-two and phase-three operations, but not the phase-one operations.

Parallel Table Functions

To take advantage of the processing power of a database server, some table functions are implemented in a manner that allows the phase-two operations to be broken into tasks that can be performed in parallel by multiple slave processes. Such slave processes consume the input rows produced by executing the nested query. The nested cursor is used to describe the metadata associated with the input rows of the table function. In the context of a PL/SQL-implemented table function, such metadata is needed by the PL/SQL engine to bind the values produced by the input cursor to the values used by the PL/SQL table function.

Given a parallel table function F and a base table T, a sample query (Q2) which fetches rows from F(T) can look like:

Q2:
   select a, b
   from TABLE(F(CURSOR(select a, b from T))).

For the purpose of explanation, it shall be assumed that the table function F is defined to have a ref-cursor parameter whose rows are partitioned by hash on column a when function F is evaluated in parallel.

For query Q2, the query plan includes a stage which executes the nested query, and a stage which executes the table function. Each stage is referred to as a "Data Flow Object" (DFO). Each DFO is executed by a group of parallel server processes, known as "slaves". The DFOs communicate data using a pipe called "Table Queue" (TQ).

The overall data flow for the query Q2 may be, for example:

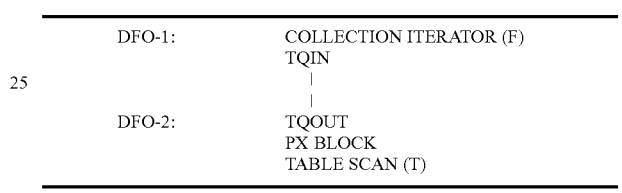

According to one approach, query Q2 is compiled by generating separate cursors for DFO-1 and DFO-2. The cursors for DFO-1 and DFO-2 shall be referred to hereafter as Qtop and Qcur, respectively. Thus, the nested query "select a, b from T" is mapped to an independent cursor handle, which is used by the table function as its input. The DFO-2 slaves execute the nested query's cursor (Qcur), while the DFO-1 slaves execute the outer cursor (Qtop).

Parallel Table Functions and the PSC Model

As mentioned above, under the PSC model, there is only one cursor, and all the parallel slave processes (regardless of the particular DFO to which they are assigned) share the cursor and execute a part of its query plan. However, parallel table functions still expect a separate cursor handle for the nested query that returns their input rows. This expectation conflicts with that fact that the PSC model requires that all parallel slave processes execute the top level cursor (e.g. Qtop), and not the nested query's cursor (e.g. Qcur).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example System

Figure 1:
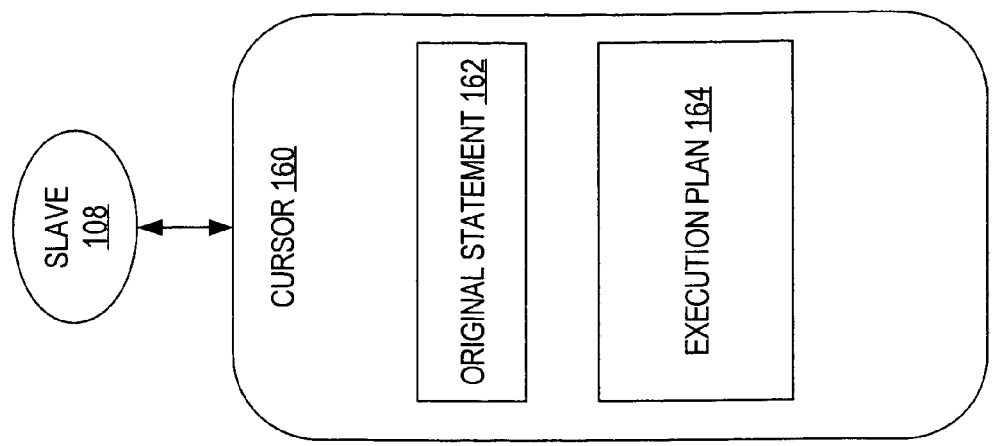
FIG. 1 is a block diagram illustrating a system in which slave processes perform work based on shared cursors and equivalent cursors, according to an embodiment of the invention.
Figure 1:
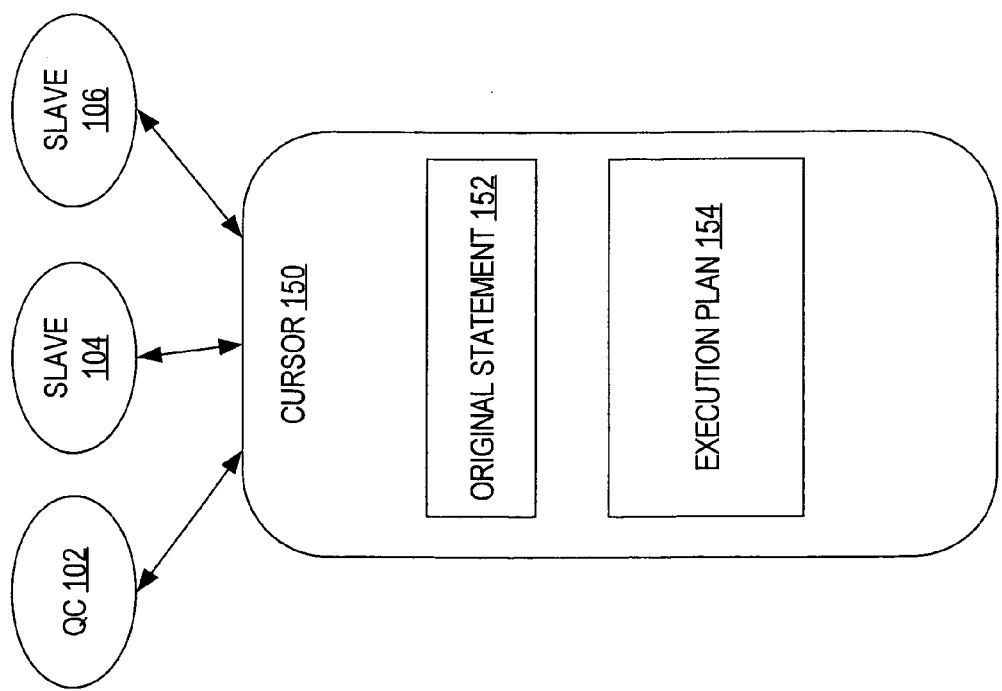

FIG. 1 is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1, the cursor 150 that contains the execution plan 154 used by the QC is made available to the slaves. Specifically, FIG. 1 illustrates a scenario in which two slaves 104 and 106 have access to the same instance of the cursor 150 that is being used by the query coordinator, and one slave 108 that has access to a separate instance of a cursor 160 which, as shall be explained in greater detail hereafter, is an equivalent of cursor 150.

Regardless of whether a slave has access to the same cursor instance as the query coordinator, or to an instance of an equivalent cursor, the slave is privy to the same information. Significantly, that information is already in compiled form, thus avoiding the need for each slave to separately parse and compile their own cursors based on SQL fragments. Further, the information thereby available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

Functional Overview

As explained above, a parallel table function expects to have a separate cursor handle for the nested subquery that provides input rows to the table function. However, the PSC model calls for a single cursor, shared by all slaves that participate in the execution of the table function statement, whether they are they are responsible for performing operations specified in the nested query, or the outer query.

To address this dilemma, techniques are described herein for (1) including in the execution plan of the outer shared cursor (Qtop) a DFO associated with the nested query, (2) providing the parallel table function a separate cursor handle (e.g. Qcur), and (3) mapping each fetch operation on the nested query's cursor handle (Qcur) into a corresponding fetch from the top level cursor (Qtop).

Context Switch Row Source

According to one embodiment, the nested query's cursor handle does not point to a conventional cursor for the nested query. Rather, although the nested cursor still exists, the nested cursor is only used to describe the format of the input stream from which rows are fetched by the CURSOR of the table function. According to one embodiment, the nested query's cursor handle points to a "dummy cursor" that includes a context switch mechanism encapsulated as a special rowsource allocated at the very top of the rowsource tree generated while generating the physical plan for the nested cursor. As shall be described in greater detail hereafter, the context switch row source serves as a mechanism to switch back and forth between (1) the nested cursor's context, and (2) the table function's context in the outer cursor, in which the table function consumes rows produced by the nested query.

Exemplary Dummy Cursor

For the purpose of illustration, reference shall be made to query Q2, which has the form:

Q2:
 select a, b
 from TABLE(F(CURSOR(select a, b from T))).

Figure 2:
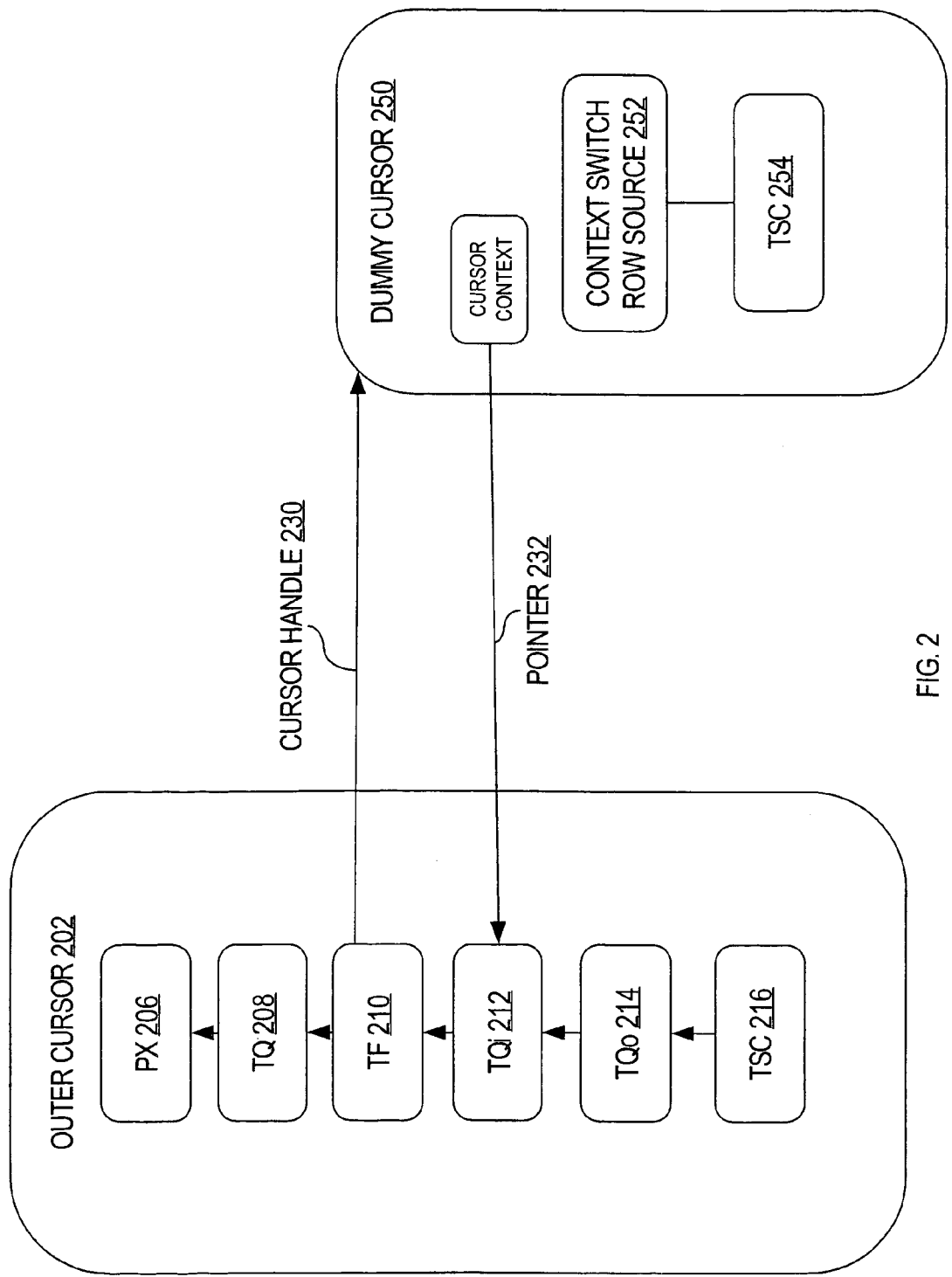
FIG. 2 is a block diagram of a dummy cursor, used as a nested cursor, through which slaves can access an outer cursor, according to an embodiment of the invention.

According to one embodiment, Q2 is compiled to produce the outer cursor 202 illustrated in FIG. 2. Referring to FIG. 2, the outer cursor 202 includes a tablescan rowsource 216 for scanning table T, as required by the nested query "select a, b from T". The rows produced by table scan source 216 are fed to table queue 214 (TQo). The data is then redistributed from table queue 214 and table queue 212 (TQi).

Rowsource TF 210 corresponds to the table function F( ). The table function F( ) expects to access the input rows through a cursor handle. As illustrated, slaves executing TF 210 use a cursor handle 230 to call a dummy cursor 250. The output of TF 210 is distributed to a table queue TQ 208, which is then consumed by PX 206 to produce the results of the query Q2.

Referring to dummy cursor 250, it includes a context switch row source 252 and a table scan row source 254. According to one embodiment, the rowsource tree for dummy cursor 250 is serial. However, the serial nature of the dummy cursor 250 rowsource tree does not prevent the parallel execution of the table function because, as will be explained in greater detail hereafter, the database server will accomplish the cursor switching inside the context switch row source 252.

Operation of the Context Switch Row Source

During compilation of the rowsource tree for dummy cursor 250, the database server saves, in the cursor context for dummy cursor 250, a pointer (pointer 232) to the table function rowsource TQi 212 representing the partitioned input stream of the table function TF 210. During execution of the table function F, the table function slaves make a recursive fetch call to fetch from the dummy cursor 250. Dummy cursor 250, in turn, calls a fetch on context switch row source 252. Inside context switch row source 252, the slave looks up the rowsource pointer 232 for the table function rowsource 210. The slave then switches from the execution context of the nested query to the context of the outer query, and performs a fetch on the child rowsource of table function rowsource 210 (i.e. the "Table Queue In" TQI rowsource 212, which represents the partitioned input stream flowing into the table function slaves) in the global parallel plan of outer cursor 202.

After the data is fetched from table queue 212, the control switches back to the nested query handle, and transfers the data to the output buffers of this handle so it can be returned to the caller (the table function slave).

The follow represents the sequence of rowsource fetches and context switches that may be performed for a fetch from F( ):

```
rwsfetch (TF 210)
    recursive fetch from (Dummy cursor 250)
        switch context to dummy cursor 250
        rwsfetch (context switch row source 252)
            switch context to outer cursor 202
                rwsfetch (TQI) -- get rows from table queue 212
            switch context back to dummy cursor 250
        ...
...
```

As illustrated by the foregoing example, the nested cursor is referred to as a dummy cursor because the nested cursor is only used as a metadata descriptor. The nested cursor is not executed at all to feed the table function, but is only used to transfer into the top level cursor subquery tree so as to get the datastream from there in the right format.

By using the input cursor as a descriptor of a subpart of the execution plan, the parallel table functions can be optimized in ways not possible in a model that relies on weakly typed cursors. A weakly typed cursor is a cursor handle that does not define its result row-type a-priori. For example, a strong typed cursor might be in the form of:

type rec_t is record (num number);
type cur1 is ref cursor return rec_t;

whereas an example of a weakly typed cursor might be in the form of:

type cur2 is ref cursor;

The rows fetched from strong type cursor "cur1" have the structure defined in record "rec_t"—that is, a single number column. For the weakly typed cursor "cur2" the structure of the result is not known. Therefore, partitioning criteria, which is based on the output columns of a weakly typed cursor, cannot be defined. In addition to the parallel table functions being optimized, unnecessary buffering of the table function input can be avoided, and the table function can be clumped with its input cursor so that the same or a larger set of slaves can be used to perform the operations associated with both tasks.

Hardware Overview

Figure 3:
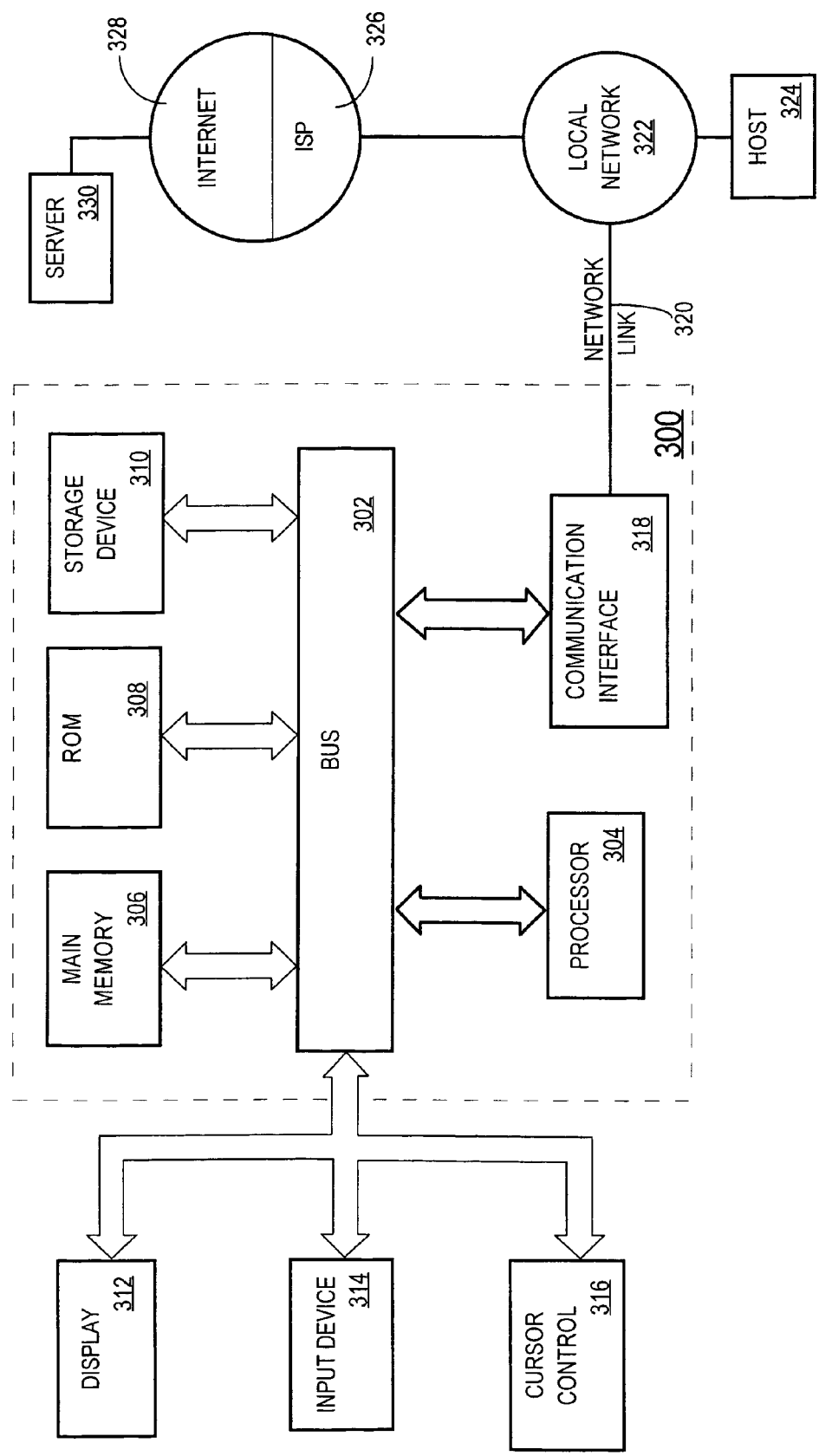
FIG. 3 is a block diagram illustrating a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a database statement that includes a table function, the method comprising the steps of:
   during compilation of the database statement, generating a first cursor that has an execution plan that includes:
      a first plan component for executing the table function; and
      a second plan component for generating input for the table function;
   generating a second cursor;
   assigning a plurality of slaves to execute the first plan component;
   causing the plurality of slaves to call the second cursor for input for the table function; and
   when a slave of the plurality of slaves calls the second cursor for input for the table function, the second cursor causes a context switch to the first cursor, so that the second plan component within the first cursor generates the input for the slave.

2. The method of claim 1 wherein:
   the step of generating a second cursor includes inserting a context switch row source at the top of a row source tree within the second cursor; and
   the context switch row source causes the context switch to the first cursor.

3. The method of claim 1 wherein:
   the step of generating the second cursor includes storing, within a cursor context of the second cursor, a pointer to the first plan component; and
   the pointer is used to perform the context switch to the first plan component within the first cursor.

4. The method of claim 1 wherein the second plan component is a table queue row source that provides input to a table function row source.

5. The method of claim 1 wherein:
   the database statement includes a subquery; and
   the second plan component produces the result of executing the subquery of said database statement.

6. The method of claim 5 wherein the subquery specifies a set of input rows for the table function.

7. A machine-readable medium storing instructions which, when executed by one or more processors, causes the one or more processors to perform the method recited in claim 1, wherein the machine-readable medium is one of a volatile medium or a non-volatile medium.

8. A machine-readable medium storing instructions which, when executed by one or more processors, causes the one or more processors to perform the method recited in claim 2, wherein the machine-readable medium is one of a volatile medium or a non-volatile medium.

9. A machine-readable medium storing instructions which, when executed by one or more processors, causes the one or more processors to perform the method recited in claim 3, wherein the machine-readable medium is one of a volatile medium or a non-volatile medium.

10. A machine-readable medium storing instructions which, when executed by one or more processors, causes the one or more processors to perform the method recited in claim 4, wherein the machine-readable medium is one of a volatile medium or a non-volatile medium.

11. A machine-readable medium storing instructions which, when executed by one or more processors, causes the one or more processors to perform the method recited in claim 5, wherein the machine-readable medium is one of a volatile medium or a non-volatile medium.

12. A machine-readable medium storing instructions which, when executed by one or more processors, causes the one or more processors to perform the method recited in claim 6, wherein the machine-readable medium is one of a volatile medium or a non-volatile medium.

* * * * *

UNITED STATES PATENT AND TRADEMARK OFFICE
CERTIFICATE OF CORRECTION

| | | |
|---|---|---|
| PATENT NO. | : 7,451,133 B2 | Page 1 of 1 |
| APPLICATION NO. | : 10/930433 | |
| DATED | : November 11, 2008 | |
| INVENTOR(S) | : Yoaz et al. | |

It is certified that error appears in the above-identified patent and that said Letters Patent is hereby corrected as shown below:

In page 2, in column 1, line 4, after "Cochrane et al." insert -- 707/3 --.

Signed and Sealed this

Thirteenth Day of April, 2010

David J. Kappos
*Director of the United States Patent and Trademark Office*